United States Patent [19]

Hermann et al.

[11] Patent Number: 4,668,556
[45] Date of Patent: May 26, 1987

[54] ELASTOMERIC PROFILED STRIP FOR SEALINGLY ENCLOSING WINDOWPANES

[75] Inventors: Dietmar Hermann, Garbsen; Richard Brodmann, Hanover, both of Fed. Rep. of Germany

[73] Assignee: Continental Gummi-Werke Aktiengesellschaft, Hanover, Fed. Rep. of Germany

[21] Appl. No.: 829,393

[22] Filed: Feb. 13, 1986

[30] Foreign Application Priority Data

Feb. 13, 1985 [DE]  Fed. Rep. of Germany ....... 3504907

[51] Int. Cl.$^4$ .............................................. E06B 7/16
[52] U.S. Cl. ....................................... 428/122; 49/490; 49/498; 52/716; 156/71; 156/308.4; 428/358
[58] Field of Search ..................... 49/490, 498; 52/716; 156/71, 308.4; 428/31, 122, 358

[56] References Cited

U.S. PATENT DOCUMENTS

| | | | |
|---|---|---|---|
| 3,462,903 | 8/1969 | Kronbetter | 52/400 |
| 3,647,704 | 3/1972 | Schrantz, Jr. | 524/929 X |
| 3,900,999 | 8/1975 | Callan | 428/521 X |
| 3,919,452 | 11/1975 | Ettre et al. | 428/188 X |
| 4,036,673 | 7/1977 | Murphy et al. | 428/95 X |
| 4,042,741 | 8/1977 | Bright | 428/122 X |
| 4,251,432 | 2/1981 | Martin | 428/407 X |
| 4,411,941 | 10/1983 | Azzola | 428/122 |
| 4,477,507 | 10/1984 | Kunert | 428/122 X |

FOREIGN PATENT DOCUMENTS 3314152 10/1984  Fed. Rep. of Germany .

Primary Examiner—Henry F. Epstein
Attorney, Agent, or Firm—Becker & Becker, Inc.

[57] ABSTRACT

An elastomeric profiled strip for sealingly enclosing a windowpane for a vehicle or a building. The profiled strip includes a base strip made of elastomeric material, and an adhesive strip that is provided on the base strip and is made of a vulcanizable elastomeric material. The subsequent vulcanization of the adhesive strip can be undertaken after the profiled strip has been mounted onto a pane while simultaneously producing an extremely durable and positive connection with the bordered pane.

13 Claims, 1 Drawing Figure

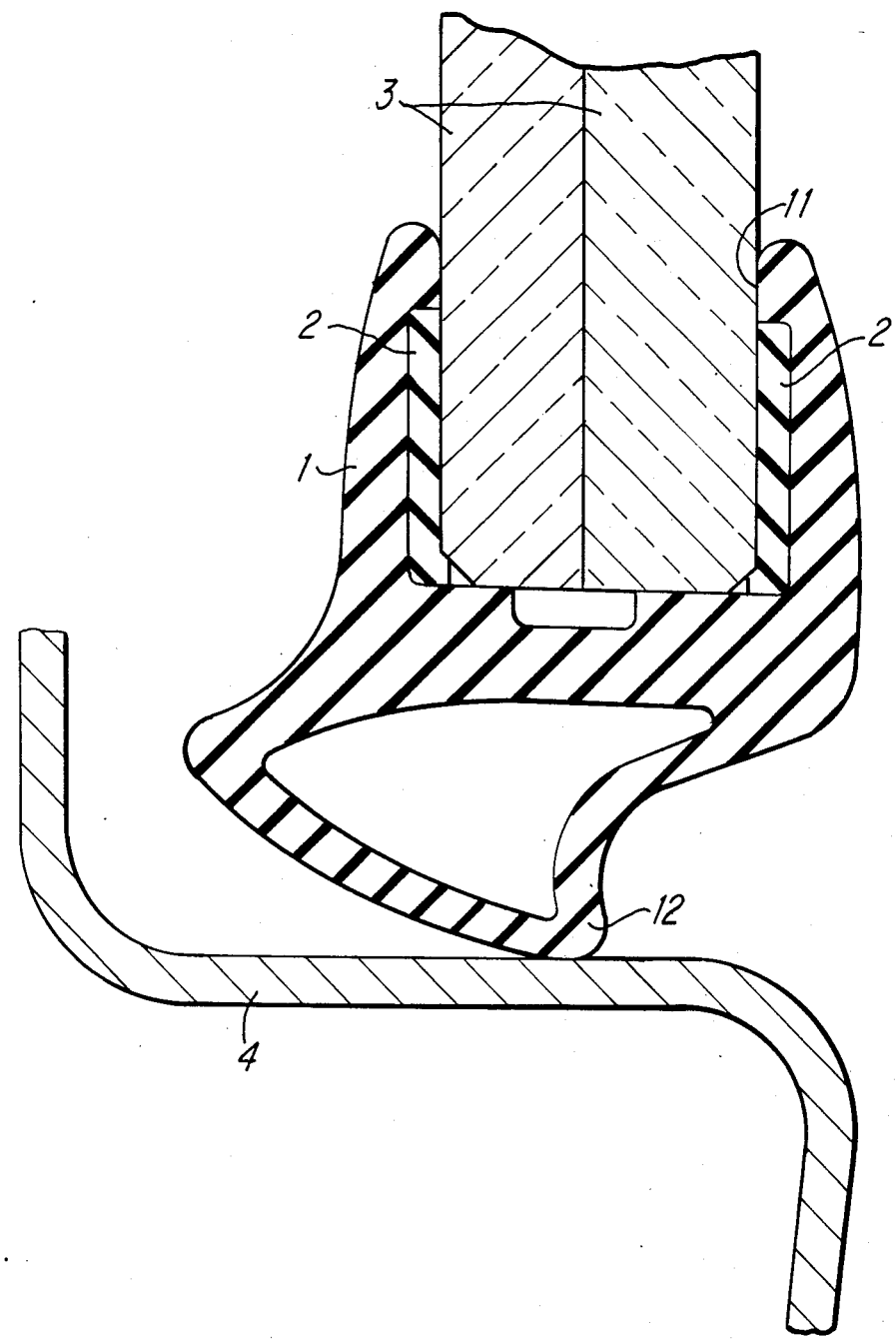

ELASTOMERIC PROFILED STRIP FOR SEALINGLY ENCLOSING WINDOWPANES

BACKGROUND OF THE INVENTION

1. Field of the Invention

The present invention relates to an elastomeric profiled strip for sealingly enclosing a windowpane for a vehicle or a building. The profiled strip has an adhesive strip that produces a self-substance or positive connection with the edges of the pane. The present invention also relates to methods of manufacturing and applying such profiled strips.

2. Description of the Prior Art

With the aid of an elastomeric profiled border strip, fixed windowpanes in vehicles and buildings are sealingly and securely held in the frame construction of the window casement, the door frame, etc., or in the flange-like border of the window opening in the vehicle body. Conventional profiled strips have a bulky cross-sectional shape and are provided with beads that project outwardly significantly beyond the surface of the glass in order to apply the necessary pressure in deeply recessed glass receiving slots. In order to avoid this shape for profiled strips, it has become customary in practice to apply the elastomeric profiled strips to the edges of windowpanes with an adhesive connection, and to install such pre-bordered windowpanes via a simplified process. Pursuant to a further known proposal (German Offenlegungsschrift No. 3 314 152), the profiled strip is placed upon the edges of a windowpane in the unvulcanized state, and is subsequently vulcanized accompanied by the simultaneous production of an adhesive connection with the glass.

The present invention proceeds from such a method, which attempts to provide ready-to-install windowpanes that have been pre-bordered. Accordingly an object of the present invention is to provide a novel elastomeric profiled strip configuration that on the one hand makes it possible to achieve an effective protection of the edges of the pane during storage and transport under all conditions, even extreme climatic conditions, and on the other hand assures a reliable support in the installed state that is absolutely sealed and is protected against strong shocks or vibrations. It is furthermore an object of the present invention to make it possible to mechanically and automatically enclose the panes as well as install the finished glass-strip units without the necessity for manual action.

BRIEF DESCRIPTION OF THE DRAWING

These objects, and other objects and advantages of the present invention, will appear more clearly from the following specification in conjunction with the following schematic drawing, which is a cross-sectional view through one exemplary embodiment of the inventive profiled strip connected to a composite glass pane in the installed position in the window opening of a vehicle body.

SUMMARY OF THE INVENTION

The profiled strips of the present invention are characterized primarily in that they comprise a profiled base strip, which is made of a vulcanized or polymerized elastomeric material, and by an adhesive strip means that is provided on the base strip and is made of a vulcanizable elastomeric material, such as an elastomeric mixture that contains natural rubber. A propellant that releases gas under the effect of the heat of vulcanization can be added to the material of the adhesive strip. In addition, the adhesive strip is expediently provided with a removable protective cover, such as of a thin sheet of thermoplastic synthetic material.

The present invention provides a two-material composite profiled strip having a novel configuration and outstanding advantages in practical usage. In the first place, the novel profiled strip makes it possible to provide a hermetic seal for the edges of the windowpane. This is of particular significance if such bordered composite or laminated glass panes are to be used in tropical regions. Furthermore, the fixed and extremely stable and positive connection that can be achieved in both directions by vulcanizing the adhesive strip results in strong cohesive forces which make it possible to have a smaller cross-sectional area of the profiled strip, as desired, and which also saves material, without adversely affecting the retaining strength and the reliability against shocks and vibrations.

The vulcanized or polymerized profiled strip of the present invention is advantageously extruded from an extrusion press, and is subsequently, possibly after being temporarily stored, provided with an adhesive strip via a further extrusion press. The thickness of this adhesive strip is several times less than the cross section of the strip itself. The novel profiled strips can be wound into rolls without any disadvantageous effects, can be stored, and can be supplied for use as required. To enclose a windowpane, the profiled strips, possibly after removing a thin protective sheet from the adhesive strip, is placed upon the edges of the pane in the position of use, whereupon the adhesive strip is vulcanized, thus producing a positive connection not only with the profiled base strip but also with the windowpane. A particular advantage of the novel adhesion system is that the adhesive strip does not run or flow away during the thermal treatment, and therefore does not form any flash that would later have to be removed. If the windowpane is laminated glass produced by melting an intermediate sheet, the vulcanization is expediently combined with the melting process, so that the adhesive strip is vulcanized simultaneously with the manufacture of the laminated glass in a single pressure and heat treatment.

To apply the adhesive strip to the profiled base strip without difficulty, the present invention utilizes the excellent inherent tackiness of the customarily used elastomeric mixtures. The adhesiveness of the still plastic and unvulcanized adhesive strips precludes the danger of changes in position of the strip during transport or use of the prepared profiled strip. Furthermore, this adhesiveness is an important prerequisite for being able to use automatically controlled procedures for applying the profiled strips to the edges of windowpanes that are frequently curved three-dimensionally. By adding an expanding agent to the elastomeric mixture of the adhesive strip, it is possible to increase even further the already existing damping or vibration-absorption effect of the novel two-material profiled strip, which serves as a connecting member between the bordered windowpane and the rigid frame construction.

It is within the scope of the present invention to use just the plain profiled strips for bordering and sealing the edges of windowpanes, and as holding elements within the window opening, or to provide the profiled strips with deformable, hollow extensions for bridging and sealingly closing-off gaps of variable width.

DESCRIPTION OF PREFERRED EMBODIMENTS

Referring now to the drawing in detail, the illustrated profiled base strip 1, for example, is made of an EPDM rubber (ethylene/propylene/nonconjugated diene terpolymer rubber) by extrusion. The strip 1 is vulcanized and is subsequently provided with adhesive strip means 2 that is applied to the inner surfaces of a groove or slot 11 for receiving glass. The adhesive strip means 2 is made of a vulcanizable natural rubber mixture, i.e. a mixture that is predominantly still in the uncured plastic state. In the shape of a closed ring, the strip 1 extends around a windowpane 3 that has been inserted into the slot 11. By means of a hollow portion 12 that has been formed onto the strip 1, the latter seals the windowpane 3 relative to the window opening of the flange-like bent sheet metal 4 of a vehicle body.

In a manner known per se, the windowpane 3 is a composite or laminated pane composed of two individual panes that have been joined together. The present invention makes it possible to combine the production of the laminated glass with the bordering of the pane, and to carry this out in a single heat and pressure treatment. The two-material profiled strip 1, 2 is placed upon the edges of the individual panes, which at this point are only loosely combined with the aid of a meltable adhesive sheet that is placed between them. During the subsequent vulcanization of the adhesive strip means 2, the adhesive sheet is also melted and activated. The result is a ready-to-install, bordered laminated glass pane having the features of the present invention.

It should be noted that it is also conceivable to eliminate the right leg of the profiled strip 1, 2 illustrated in the drawing, and still have a profiled strip that fulfills the objects of the present invention. As with the previously described embodiment, this embodiment could be utilized with or without the hollow portion 12.

The present invention is, of course, in no way restricted to the specific disclosure of the specification and drawing, but also encompasses any modifications within the scope of the appended claims.

What we claim is:

1. An elastomeric profiled strip fully prepared for sealingly bordering a windowpane for a vehicle or a building; said profiled strip comprising:
   a profiled base strip made of a polymerized elastomeric material that is fully vulcanized; and
   adhesive strip means already provided on said base strip for subsequently engaging and adhering to the edges of said windowpane; said adhesive strip means being made of an unvulcanized elastomeric material which is vulcanizable via application of heat briefly to establish a fully secure water-tight connection between said profiled strip and said windowpane.

2. A profiled strip according to claim 1, in which said base strip is made of a material selected from the group consisting of vulcanized elastomers and polymers.

3. A profiled strip according to claim 1, in which said adhesive strip means is made of an elastomeric mixture that contains natural rubber.

4. A profiled strip according to claim 1, in which said adhesive strip means contains a propellant that releases a gas under the effect of heat of vulcanization.

5. A profiled strip according to claim 1, in which said adhesive strip means contains an expanding agent.

6. A profiled strip according to claim 1, in which said adhesive strip means is provided with a removable protective covering on that side remote from said base strip.

7. A profiled strip according to claim 6, in which said protective covering is a thin sheet of thermoplastic synthetic material.

8. A profiled strip according to claim 1, in which said base strip is provided with a deformable hollow portion that is formed on said base strip remote from said adhesive strip means.

9. A profiled strip according to claim 1, in which said base strip is provided with a slot for receiving said windowpane; and in which said adhesive strip means is provided on said base strip in said slot thereof.

10. A method of producing an elastomeric profiled strip for sealingly bordering a windowpane for a vehicle or a building; said method includes the steps of:
    extruding a profiled base strip, the inner surface of which has a groove or slot; and
    providing said groove or slot a vulcanizable adhesive strip means having a thickness that is several times less than the cross section of said profiled strip.

11. A method according to claim 10, in which said providing step comprises extruding said adhesive strip means onto said base strip.

12. A method of enclosing a windowpane with a polymerized elastomeric profiled strip fully prepared for sealingly bordering a windowpane for a vehicle or a building and including
    a two-material profiled base strip made of an elastomeric material that is fully vulcanized; and
    adhesive strip means already provided on said base strip for subsequently engaging and adhering to the edges of said windowpane; said adhesive strip means being made of an unvulcanized elastomeric material which is vulcanizable via application of heat briefly to establish a fully secure watertight connection between said profiled strip and said windowpane; said method comprising the steps of;
    applying said profiled strip to the edges of said windowpane in the position of use; and
    vulcanizing said adhesive strip means via the application of heat to produce a positive connection not only with said base strip but also with said windowpane.

13. A method according to claim 12, which inlcudes the steps of providing, as said windowpane, a laminated glass pane that is produced by the melting of an intermediate sheet; and vulcanizing said adhesive strip means while simultaneously melting said intermediate sheet.

* * * * *